Oct. 7, 1958  F. F. ARMAND  2,854,783
FISH LURE HOLDER
Filed April 2, 1956
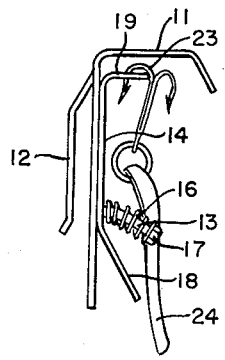
FIG.—1
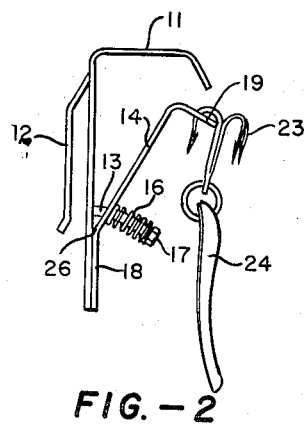
FIG.—2
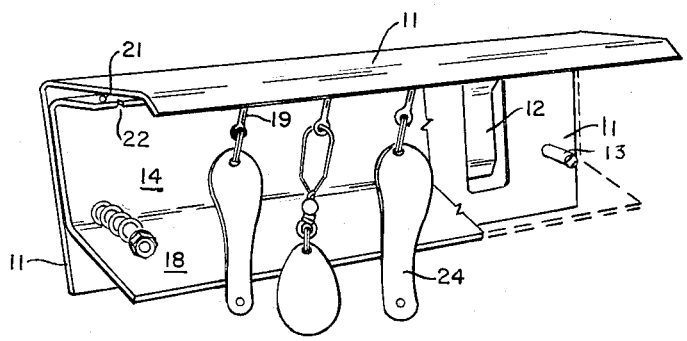
FIG.—3
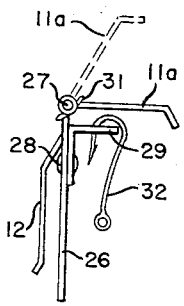
FIG.—4
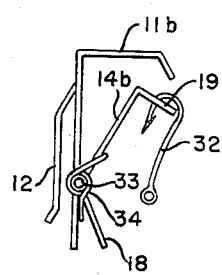
FIG.—5
INVENTOR.
FRANCIS F. ARMAND
BY
ATTORNEY

United States Patent Office 2,854,783
Patented Oct. 7, 1958

2,854,783

FISH LURE HOLDER

Francis F. Armand, Denver, Colo.

Application April 2, 1956, Serial No. 575,614

3 Claims. (Cl. 43—57.5)

This invention relates to apparatus for holding fishing lures and, more particularly, to a fish lure holder adapted to receive and hold fishing lures in alternate positions for use and storage.

An objective of the present invention is to provide a holder for fishing lures that may be worn on the person of the fisherman in readily available position and which provides means for holding the hooks associated with the lure in a position where they will not be snagged or fouled during fishing activity.

Another objective of the present invention is to provide a fish lure holder of the foregoing type in which means is provided for carrying the fishing lures in a first sheltered position and for holding the lures in an alternate position of exposure when desired, so that the fishing lures may be readily removed from their holder for use.

Other objects and advantages of the present invention will be apparent from the appended description and drawings, in which Fig. 1 is an end elevation showing a preferred embodiment of this invention in normal lure carrying position, Fig. 2 is an end elevation showing the apparatus of Fig. 1 in alternate lure release position, Fig. 3 is a perspective view in partial section showing additional features of this invention, Fig. 4 is an end elevation showing structural features of another embodiment of this invention, and Fig. 5 is an end elevation of another form of the invention.

Briefly stated, the present invention provides a fish lure holder that may be secured to a fisherman's person in handily available position that is adapted to carry a plurality of fishing lures in such manner that they will not become fouled one with the other when in guarded position. Mechanism is provided for moving the lure holder member and a hook guard member pivotally with respect to each other, so that the fish hooks and lures may be placed in exposed position for easy removal when it is desired to change the lure being used.

The detailed features of separate embodiments of the invention can be more readily described with reference to the accompanying drawings, in Figs. 1, 2 and 3 of which the alternate carrying and dispensing positions of a preferred embodiment are shown. In these figures a guard-support structure 11 is shown which provides punched-out hanger members 12, so that the entire structure may be positioned on a fisherman's belt or along a clothing pocket. The guard structure further provides support for outwardly extending pegs 13 upon which a lure holder member 14 may be mounted. As shown, a spring 16 is positioned for compression between the lure holder 14 and a cap 17 on the end of the pegs 13. The lure holder 14 is provided with an angularly extending portion 18 at its lower end and an outwardly bent rack 19 at its upper end.

The rack portion 19 is provided with a plurality of spaced holes 21 along the length of the holder 14 and a plurality of mating cut notches 22 in the outer edge of the rack 19. These holes 21 and notches 22 are adapted to receive the hooks 23 of all types of fishing lures 24.

With the elements named positioned as shown, it will be obvious that operating pressure exerted against the end 18 will pivotally move the holder 14 about its bend radius 26 away from its carrying position to a dispensing position, as shown in Fig. 2. After the selected lure has been removed, release of the pressure will allow the force exerted by the spring 16 against the lure holder 14 to move the holder back into the carrying or storage position.

Since many lures may be carried in side-by-side position on a holder of the foregoing type without danger of the hooks of one lure fouling with hooks of adjacent lures, it will be obvious that this invention provides means for the efficient handling and dispensing of fishing lures.

Modifications of this invention are shown in Figs. 4 and 5, in Fig. 4 of which it is seen that the guard holder 11a is pivotally mounted on a back support piece 26 by means of a hinge 27. The lure holder 29 is positioned beneath the guard 11a and secured to the back 26 by means of rivets 28. As in the previous embodiment, punched out hanger members 12 are provided to facilitate attachment to the fisherman's clothing. For operation of the device a coil spring 31 is positioned about the hinge pin 27 to urge the guard 11a toward closed position. When it is desired to remove fish hooks or lures 32 from the holder, the guard 11a will be moved to the alternate position, as shown.

Fig. 5 shows an alternate structural arrangement similar to the form shown in Figs. 1, 2 and 3. In this embodiment a pivot pin 33 is provided for pivotally securing the guard structure 11b to the lure holder 14b, and a coil spring 34 is provided which tends to urge the lure holder 14b toward the closed position similar to that depicted in Fig. 1.

While separate embodiments of the present invention have been shown and described, it will be apparent that this invention is adaptable to various modifications and changes. All such modifications as come within the scope of the hereunto appended claims are deemed to be a part of this invention.

What is claimed is:

1. A fishing gear storage mechanism comprising a guard-support member inclusive of a support portion and a guard portion, a fishing gear holder providing a plurality of spaced openings adapted to receive and hold the hook of various types of fishing gear, an actuator portion on said fishing gear holder extending outwardly therefrom and providing fulcrum means coacting between said guard support and holder for permitting relative pivotal movement between said holder and at least the guard portion of such guard-support when pressure is exerted against said actuator portion, and resilient means opposing movement of said elements away from a first closed position in which the fishing gear is shielded by said guard portion toward an open position where the gear is exposed for easy removal.

2. A fishing gear storage mechanism for wear on the person of a fisherman comprising a guard-support member inclusive of a support portion and a guard portion, hanger members on the support portion of said guard-support for ready engagement with the user's clothing, a fishing gear holder providing a plurality of spaced openings adapted to receive and hold the hook of various types of fishing gear, an actuator portion on said fishing gear holder extending outwardly therefrom and providing fulcrum means coacting between said guard support and holder for permitting relative pivotal movement between said holder and at least the guard portion of such guard-support when pressure is exerted against said actuator portion, and resilient means opposing movement of said elements away from a first closed position in which the fishing gear is shielded by said guard portion toward an open position where the gear is exposed for easy removal.

3. A fishing gear storage mechanism comprising a guard-support member inclusive of a support portion and a guard portion, a fishing gear holder providing a plurality of spaced openings adapted to receive and hold the hook of various types of fishing gear, outwardly extending posts on the support portion of said guard-support adapted to engage and hold said fishing gear holder in operative position, an actuator portion on said fishing gear holder extending outwardly therefrom and providing fulcrum means adjacent said posts and coactive between said guard-support and holder for permitting relative pivotal movement therebetween when pressure is exerted against said actuator portion, and a spring on said posts and acting against said fishing gear holder for opposing movement of said holder away from a first closed position in which the fishing gear is shielded by said guard portion toward an open position where the gear is exposed for easy removal.

References Cited in the file of this patent

UNITED STATES PATENTS

| | | |
|---|---|---|
| 1,485,496 | Elliott | Mar. 4, 1924 |
| 1,900,035 | Beck | Mar. 7, 1933 |
| 2,177,181 | Jenkins | Oct. 28, 1939 |
| 2,229,292 | Heiner | Jan. 21, 1941 |
| 2,268,920 | Baumgarter | Jan. 6, 1942 |
| 2,456,527 | Moore | Dec. 14, 1948 |
| 2,691,843 | Clayton | Oct. 19, 1954 |
| 2,701,484 | McGinnis | June 14, 1955 |

OTHER REFERENCES

| | | |
|---|---|---|
| 27,109 | Great Britain | of 1897 |
| 225,941 | Switzerland | June 14, 1943 |